United States Patent
Pickelsimer

(10) Patent No.: US 7,567,983 B2
(45) Date of Patent: Jul. 28, 2009

(54) CUSTOMER FEEDBACK REPORTING

(75) Inventor: Lisa Ann Pickelsimer, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 297 days.

(21) Appl. No.: 11/508,029

(22) Filed: Aug. 22, 2006

(65) Prior Publication Data

US 2007/0153318 A1    Jul. 5, 2007

Related U.S. Application Data

(60) Provisional application No. 60/718,472, filed on Sep. 19, 2005.

(51) Int. Cl.
   G06F 3/00      (2006.01)
   G06F 7/00      (2006.01)
   G06F 13/00     (2006.01)
   G06F 17/00     (2006.01)
   H04N 5/445     (2006.01)

(52) U.S. Cl. .................. 707/104.1; 725/38; 725/46; 725/61

(58) Field of Classification Search .............. 707/104.1; 725/38, 46, 61
   See application file for complete search history.

(56) References Cited

U.S. PATENT DOCUMENTS

| | | | | |
|---|---|---|---|---|
| 5,253,184 A | * | 10/1993 | Kleinschnitz | 702/184 |
| 5,758,257 A | * | 5/1998 | Herz et al. | 725/116 |
| 7,269,775 B2 | * | 9/2007 | Pendakur et al. | 714/748 |
| 7,443,295 B2 | * | 10/2008 | Brice et al. | 340/568.5 |
| 2002/0194140 A1 | * | 12/2002 | Makuck | 705/67 |
| 2003/0061305 A1 | * | 3/2003 | Copley et al. | 709/217 |
| 2003/0093792 A1 | * | 5/2003 | Labeeb et al. | 725/46 |
| 2004/0194128 A1 | * | 9/2004 | McIntyre et al. | 725/32 |
| 2006/0133768 A1 | * | 6/2006 | Ellis | 386/52 |

* cited by examiner

*Primary Examiner*—James Trujillo
*Assistant Examiner*—Jorge A Casanova
(74) *Attorney, Agent, or Firm*—Merchant & Gould P.C.

(57) ABSTRACT

Systems and methods are disclosed for reporting customer feedback. The disclosed systems and methods may include extracting data in response to content selections by the customer, wherein the extracted data indicates customer preference data based on a content selection. Furthermore, the disclosed systems and methods may include storing the extracted data into a data repository and categorizing the extracted data for use by the content operator. Moreover, the disclosed systems and methods may include receiving a query requesting categorized data from the data repository and reporting the categorized data to the content operator.

19 Claims, 13 Drawing Sheets

CUSTOMER FEEDBACK REPORTING

RELATED APPLICATION

Under provisions of 35 U.S.C. § 119(e), the Applicants claim the benefit of U.S. provisional application No. 60/718,472, filed Sep. 19, 2005, which is incorporated herein by reference.

BACKGROUND

I. Field of the Invention

The present invention generally relates to methods and systems for reporting customer feedback. More particularly, the present invention relates to reporting cable customer data regarding preferences for entertainment on-demand viewing as well as system usage information for content viewing systems.

II. Background Information

Customer feedback reporting is a process for providing data to a content operator, for example, a cable operator, about customer preferences and usage in order for the content operator to better serve their customers. Also, the data about customer preferences could further be provided to a content provider which sells content to the content operator to determine which content to further pursue and which content to stop producing. In some situations, such data would reside in several areas in a content operator's business structure, and can vary depending on a particular market in which the customer resides. The data can also be difficult to assemble in a timely manner, which could delay important decisions by the content operator regarding customer services.

For example, a movie listing, for example, "Star Wars" Episode III, may be very popular for customer viewing in San Diego, Calif., but customers in Orange County, California may prefer viewing "Madagascar." In addition, customers in a particular market may prefer viewing an original series produced by a content provider, for example, HBO's "The Soprano's", instead of viewing movies provided by the content operator. The conventional strategy for providing such data includes acquiring information that can be gleaned from customer billing records, for example, where a customer purchases an on-demand viewing of "Madagascar". This often causes problems because the conventional strategy does not obtain information concerning content viewing when the customer has a subscription for viewing content provided by a content provider, for example, HBO. Thus, any data regarding customer viewing habits for HBO on-demand is difficult to obtain. In addition, any data regarding customer viewing habits or customer problems with viewing content is not assembled into a format which is easily discernable by the content operator's technical support staff, customer service staff or any other segment within the content operator's company. Thus, the content operator cannot make timely changes to content or determine areas in which content is not being received by customers.

In view of the foregoing, there is a need for methods and systems for reporting customer data more efficiently. Furthermore, there is a need for reporting customer data in a manner which is useful for content operators for making decisions about content available to customers in an on-demand format and for providing data about customer preferences to a content provider.

SUMMARY

Consistent with embodiments of the present invention, systems and methods are disclosed for reporting customer feedback.

In accordance with one embodiment, a method of reporting customer preference data and customer usage data in response to content provided to the customer for use by a content operator comprises extracting data in response to content selections by the customer, wherein the extracted data indicates customer preference data based on a content selection, storing the extracted data into a data repository, categorizing the extracted data for use by the content operator, receiving a query requesting categorized data from the data repository and reporting the categorized data to the content operator.

According to another embodiment, a system for reporting customer preference data and customer usage data in response to content provided to the customer for use by a content operator comprises at least one memory stage device for maintaining one or more databases, at least one processing unit coupled to the at least one memory storage device, wherein the at least one processing unit is operative to extract data in response to content selections by the customer, wherein the extracted data indicates customer preference data based on a content selection, store the extracted data into a data repository, categorize the extracted data for use by the content operator, receive a query requesting categorized data from the data repository and report the categorized data to the content operator.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
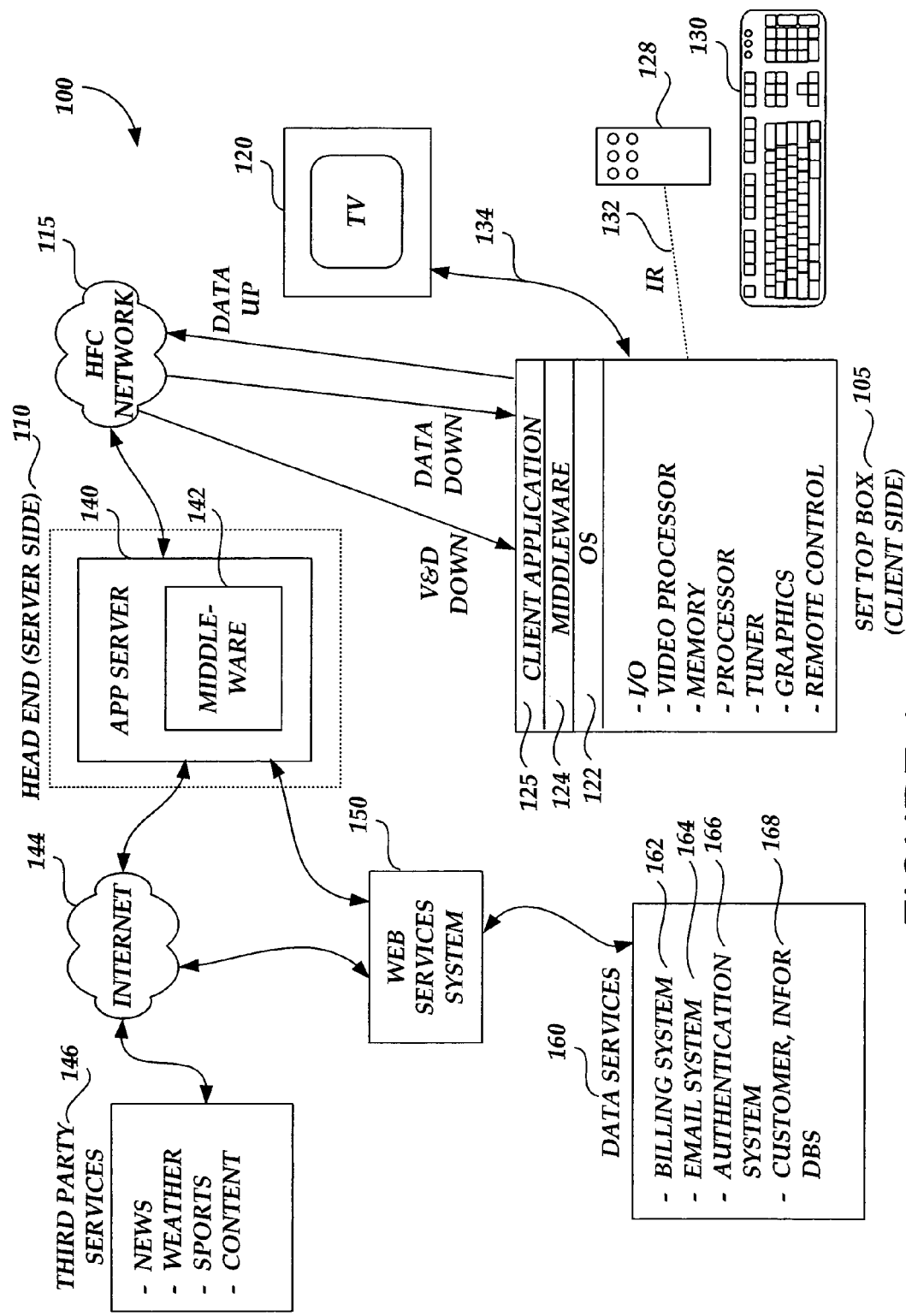
FIG. 1 is a simplified block diagram illustrating a cable television/services system architecture that serves as an exemplary operating environment for the present invention, according to one embodiment.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Operating Environment

Embodiments of the present invention may be implemented in a number of distributed computing environments where functionality is tailored for provision of customer support services. According to an illustrated embodiment, the present invention can be implemented in a cable television/services system. FIG. 1 is a simplified block diagram illustrating a cable television/services system 100 (hereafter referred to as "CATV") architecture that serves as an exemplary operating environment for the present invention.

Referring now to FIG. 1, digital and analog video programming, information content and interactive television services may be provided via a hybrid fiber coax (HFC) network 115 to a television set 120 for consumption by a cable television/services system customer (customer). The HFC network 115 can combine both optical fiber and coaxial cable lines. Typically, optical fiber can run from a server-side head end 110 to neighborhoods of 500 to 2,000 customers. Coaxial cable can run from optical fiber feeders to each customer. Functionality of the HFC network 115 may allow efficient bidirectional data flow between a client-side set-top box 105 and a server-side application server 140.

The CATV system 100 may also include a distributed client-server computing system for providing video and data flow across the HFC network 115 between server-side services providers (e.g., cable television/services providers) via the server-side head end 110 and the client-side customer via a client-side set-top box (STB) 105 functionally connected to a customer receiving device, such as a television set 120. CATV systems 100 may provide a variety of services across the HFC network 115 including digital and analog video programming, telephone services, high speed Internet access, video-on-demand, and information services.

On the client side of the CATV system 100, digital and analog video programming, and digital and analog data can be provided to the customer television set 120 via the set-top box (STB) 105. Interactive television services that allow a customer to input data to the CATV system 100 can also be provided by the STB 105. As illustrated in FIG. 1, the STB 105 may be a multipurpose computing device having a computer processor, memory and an input/output mechanism (not shown). The input/output mechanism can receive input from server-side processes via the HFC network 115 and from customers via input devices such as a remote control device 128 and a keyboard 130. The remote control device 128 and the keyboard 130 may communicate with the STB 105 via a suitable communication transport such as an infrared connection 132. The STB 105 can also include a video processor for processing and providing digital and analog video signaling to the television set 120 via a cable communication transport 134. A multi-channel tuner (not shown) may be provided for processing video and data to and from the STB 105 and the server-side head end system 110, described below.

The STB 105 may also include an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash from a third party service 146 to the television 120 at the direction of the client application 125 responsible for displaying news items.

Because a variety of different operating systems 122 may be utilized by a variety of different brands and types of set-top boxes, a middleware layer 124 can be provided to allow a given software application to be executed by a variety of different operating systems. The middleware layer 124 may include a set of application programming interfaces (API) that are exposed to client applications 125 and operating systems 122 thereby allowing the client applications 125 to communicate with the operating systems 122 through common data calls understood via the API set. As described below, a corresponding middleware layer 142 can be included on the server side of the CATV system 100 for facilitating communication between the server-side application server 140 and the client-side STB 105. The middleware layer 142 of the server-side application server and the middleware layer 124 of the client-side STB 105 can format data passed between the client side and server side using an Extensible Markup Language (XML) format.

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 using a data uplink.

The video/data downlink may be an "in band" downlink. The "in band" downlink may be used for transferring digital and analog video and data signaling from the server side of the CATV system 100 through the HFC network 115 to the set-top box 105. Thus, the digital and analog video and data signaling can be used by the STB 105 for distribution to the television set 120. The "in band" signaling space operates at a frequency between, for example, 54 and 860 megahertz. The signaling space between 54 and 860 megahertz is generally divided into 6 megahertz channels in which may be transmitted using a single analog signal or multiple digital signals (e.g., up to ten).

The data downlink and the data uplink, illustrated in FIG. 1, between the HFC network 115 and the set-top box 105 may also include "out of band" data links. An "out of band" frequency range generally lies between zero and 54 megahertz. Data flow between the client-side set-top box 105 and the server-side application server 140 may utilize the "out of band" data links. Alternatively, an "in band" data carousel may be positioned in an "in band" channel in which a data feed may be processed from the server-side application server 140 through the HFC network 115 to the client-side STB 105.

Referring still to FIG. 1, the server-side head end 110 of the CATV system 100 may be positioned on the server side of the CATV system 100 and can include hardware and software systems responsible for originating and managing content for distributing data through the HFC network 115 to client-side STB 105 for presentation to customers via the television 120. As described above, a number of services may be provided by the CATV system 100, including but not limited to digital and analog video programming, interactive television services, telephone services, video-on-demand services, targeted advertising, and provision of information content.

The application server 140 can be a general-purpose computing system operative to assemble and manage data sent to and received from the client-side set-top box 105 via the HFC network 115. As described above with reference to the set-top box 105, the application server 140 may include a middleware layer 142 for processing and preparing data from the head end 110 of the CATV system 100 for receipt and use by the client-side set-top box 105. For example, the application server 140 via the middleware layer 142 may obtain data from third-party services 146 via the Internet 140. The third party data may be then be transmitted to a customer through the HFC network 115 and the set-top box 105. For example, a weather report created by a third-party weather service may be downloaded by the CATV system 100 using the application server 140 and the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 can be formatted using an Extensible Markup Language (XML) and can be passed to the set-top box 105 through the HFC network 115. The XML-formatted data may be utilized by the client application 125 in concert with the middleware layer 124, as described above. Data from a variety of third-party services, including news data, weather data, sports data and other information content may be obtained by the application server 140 from third party services 146 using distributed computing environments such as the Internet 144 for provision to customers via the HFC network 115 and the set-top box 105.

The application server 140 obtains customer support services data, including billing data, information on customer work order status, answers to frequently asked questions, services provider contact information, and the like from data services 160 for provision to the customer via an interactive television session. As illustrated in FIG. 1, data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. The billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. Such customer information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. The disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems. The data query may be used for obtaining any required data for a requesting customer as identified by a set-top box identification. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
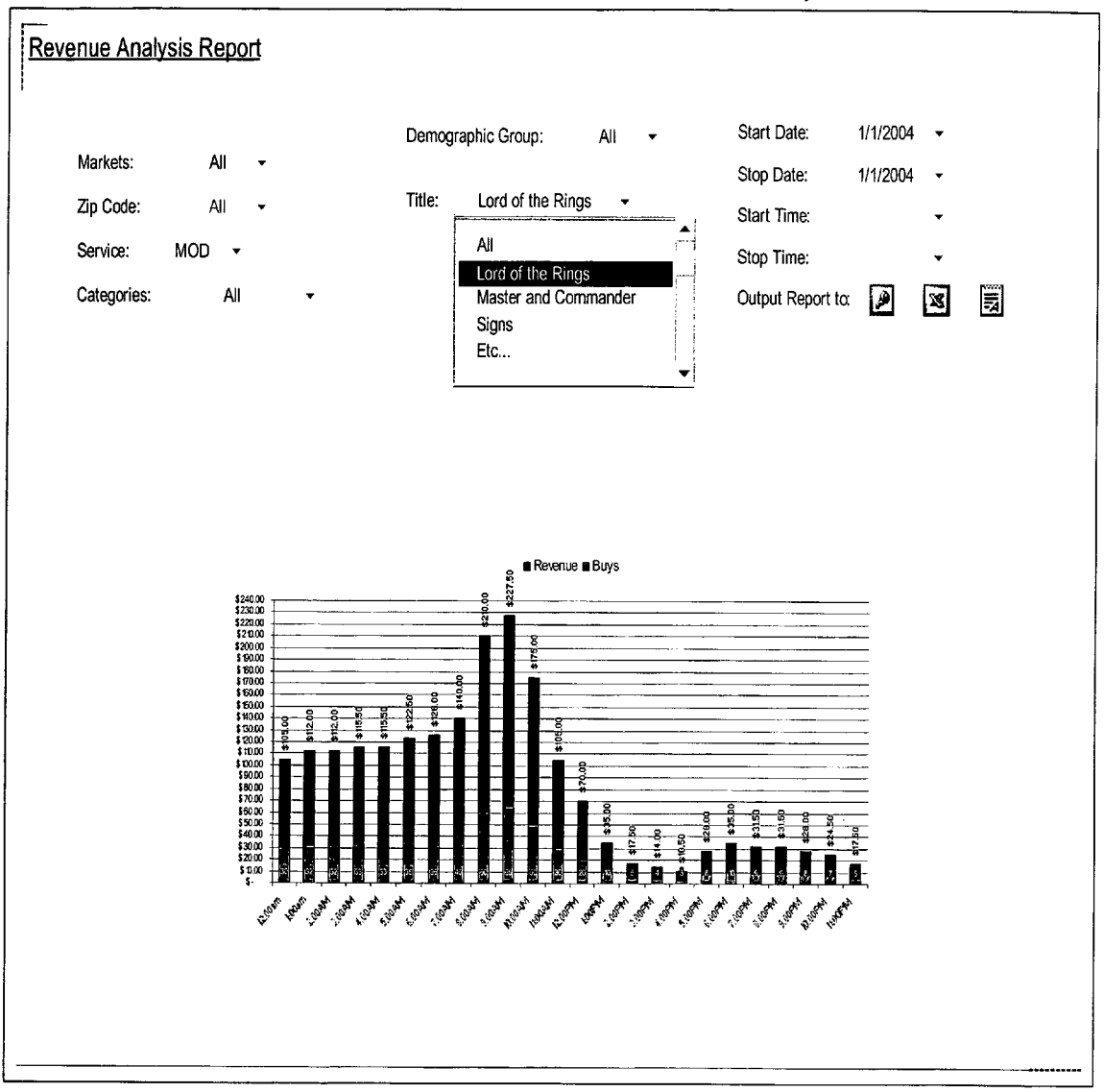
FIG. 2 is an exemplary output by the system of FIG. 1, according to one embodiment.

FIG. 2 illustrates an exemplary output 200 when using cable television/services system 100 of FIG. 1 to obtain customer preference data and customer usage data. The exemplary output 200 may provide a revenue analysis report.

A revenue analysis report may provide information to a segment of a content operator's company detailing content purchases for a given piece of content and any revenue generated from the content purchase. Because the data services 160 can categorize and organize customer preference data and customer usage data, the revenue analysis report can be used to provide information regarding content purchases, for example, for multiple markets in which the content operator provides content to customers, specific markets in which the content operator provides content to customers, or specific areas with a market in which the content operator provides content to customers using, for example, a zip code. Other categorized information that may be provided in the revenue analysis report can include revenue information based on a particular customer demographic.

Output 200 illustrates customer purchases and revenue received from the customer purchases when viewing content, for example, the movie "Lord of the Rings, The Return of the King," for all markets in which the content operator provided the movie to customers on a particular day. The revenue analysis report may be sorted to narrow information displayed to the content operator by, for example, market and demographic, using, for example, a pull-down menu, call menu table or the like. Other categorizations may include movie category and type of service used by the customer to purchase the movie, for example, Movies on-demand (MOD), Subscription On-Demand (SVOD), Free Zone, Showcase or Local on-demand (LOD).

Figure 3:
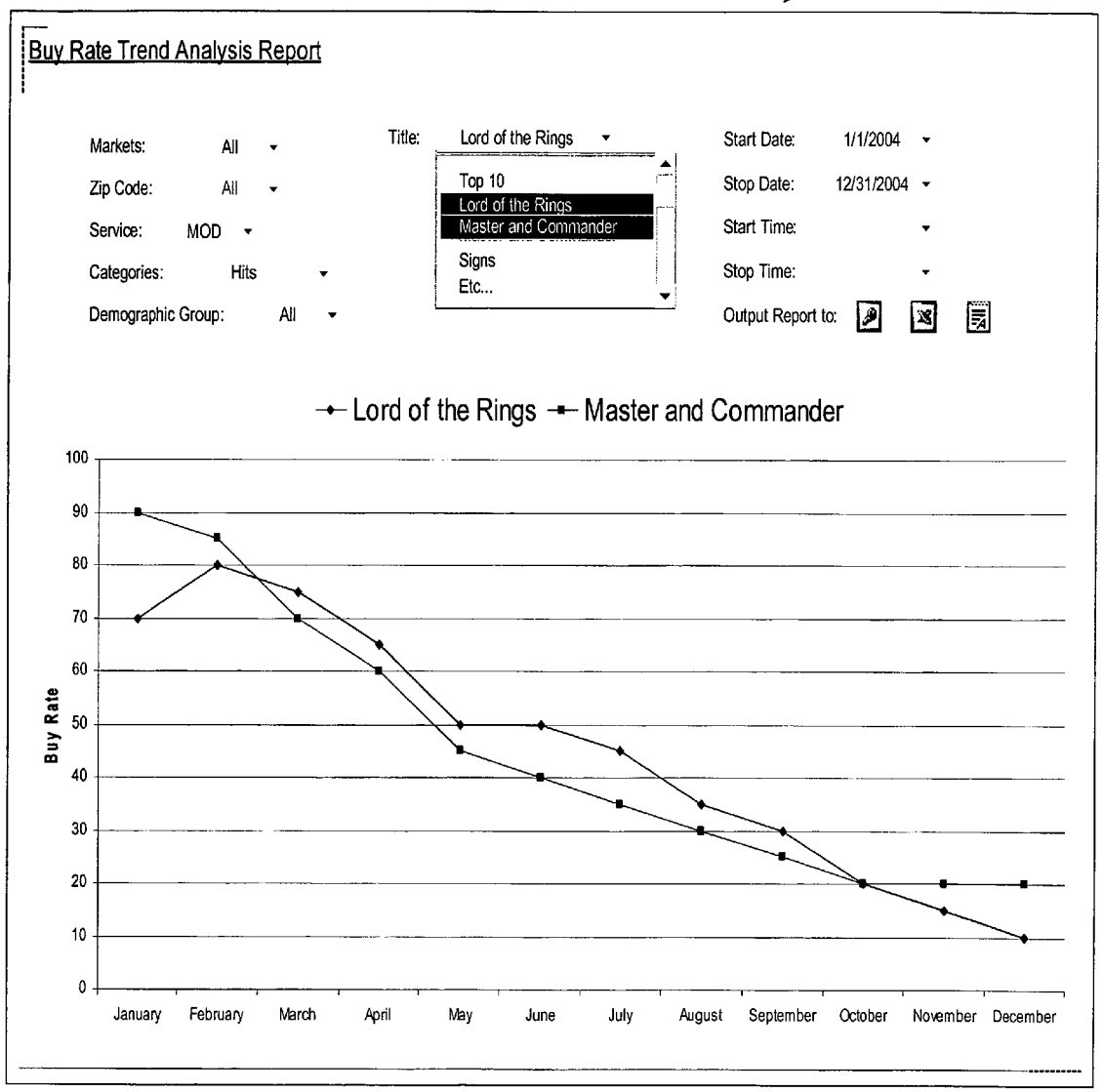
FIG. 3 is an exemplary output by the system of FIG. 1, according to one embodiment.

FIG. 3 illustrates another exemplary output 200 when using cable television/services system 100 of FIG. 1 to obtain customer preference data and customer usage data. The exemplary output 200 may provide a buy rate trend analysis report. The buy rate trend analysis report provides the content operator with information relating to trend information as it relates to customer content purchases over a period of time. Calculating buying trends may entail comparing an amount of content purchases to a total number of Entertainment on-demand (EOD) customers. Thus, buy rate=purchases/total number of EOD customers. The buying trend information can be used by content operators to determine how customer buying rates of certain content are affected. For example, the buy rate trend analysis report can be used to determine how time since a movie release affects customer buying rates, or how a content operator's incentive offers affect customer buying rates. As with the revenue analysis report, the buy rate trend analysis report can focus data in the report based on a market, demographic and the like. In addition, multiple content titles may be included in the buy rate trend analysis report.

Figure 4:
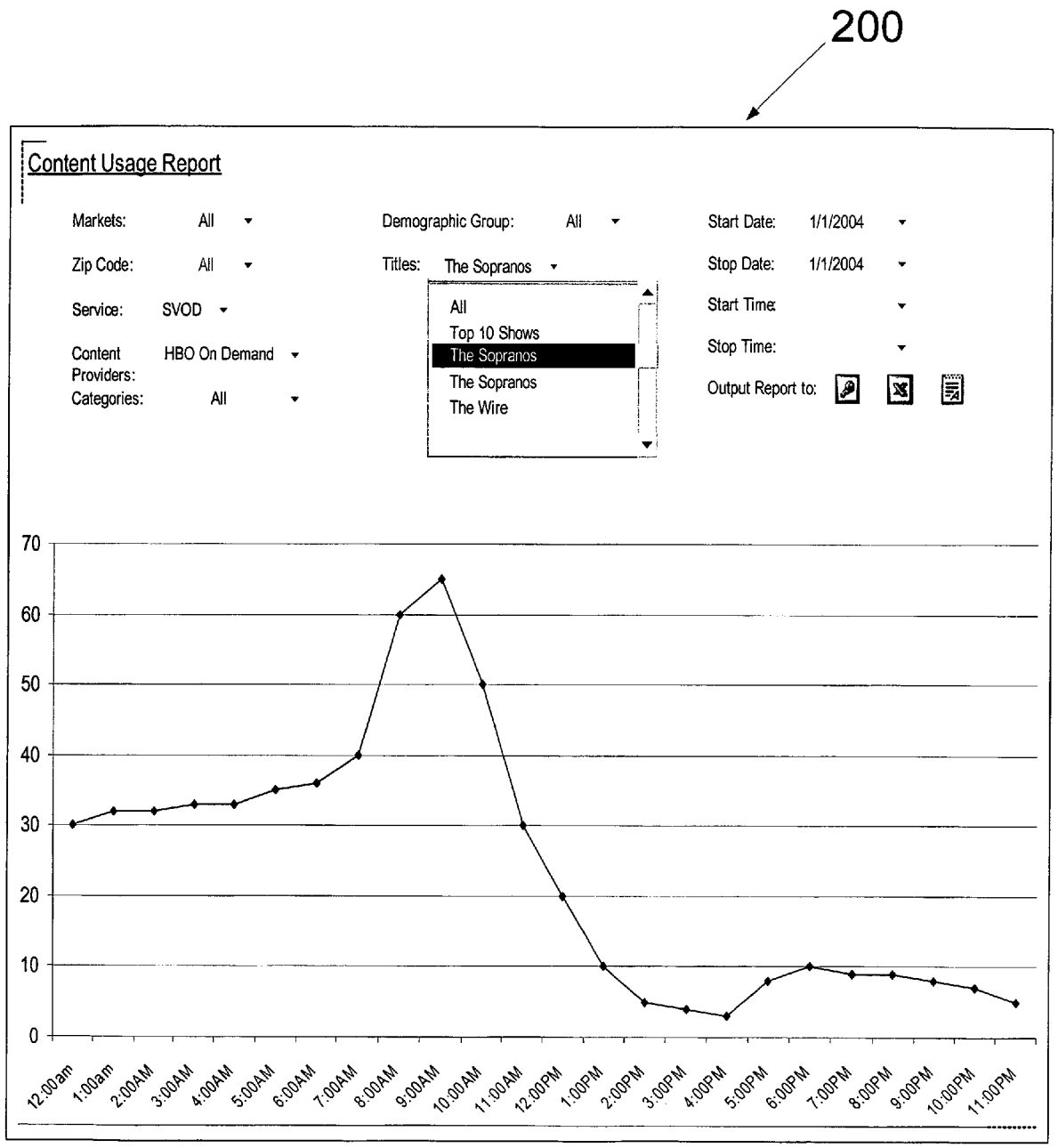
FIG. 4 is an exemplary output by the system of FIG. 1, according to one embodiment.

FIG. 4 illustrates another exemplary output 200 when using cable television/services system 100 of FIG. 1 to obtain customer preference data and customer usage data. The exemplary output 200 may provide a content usage report. The content usage report provides the content operator with information relating to trends in customer viewing of a particular piece of content, for example, a particular movie. Thus, a content operator can acquire information relating to the number of views of a particular movie. As with the revenue analysis report, the content usage report can focus data in the report based on a market, demographic and the like. The content usage report can provide content usage information on both transactional viewing (e.g., MOD) and subscription based viewing (e.g., HBO on-demand). In addition, the content usage report may be used to determine areas where customers are not receiving content correctly (content outage). For example, areas where content usage is at 0% may indicate that there may be transmission problems for this area, or certain customers may have content reception problems.

Figure 5:
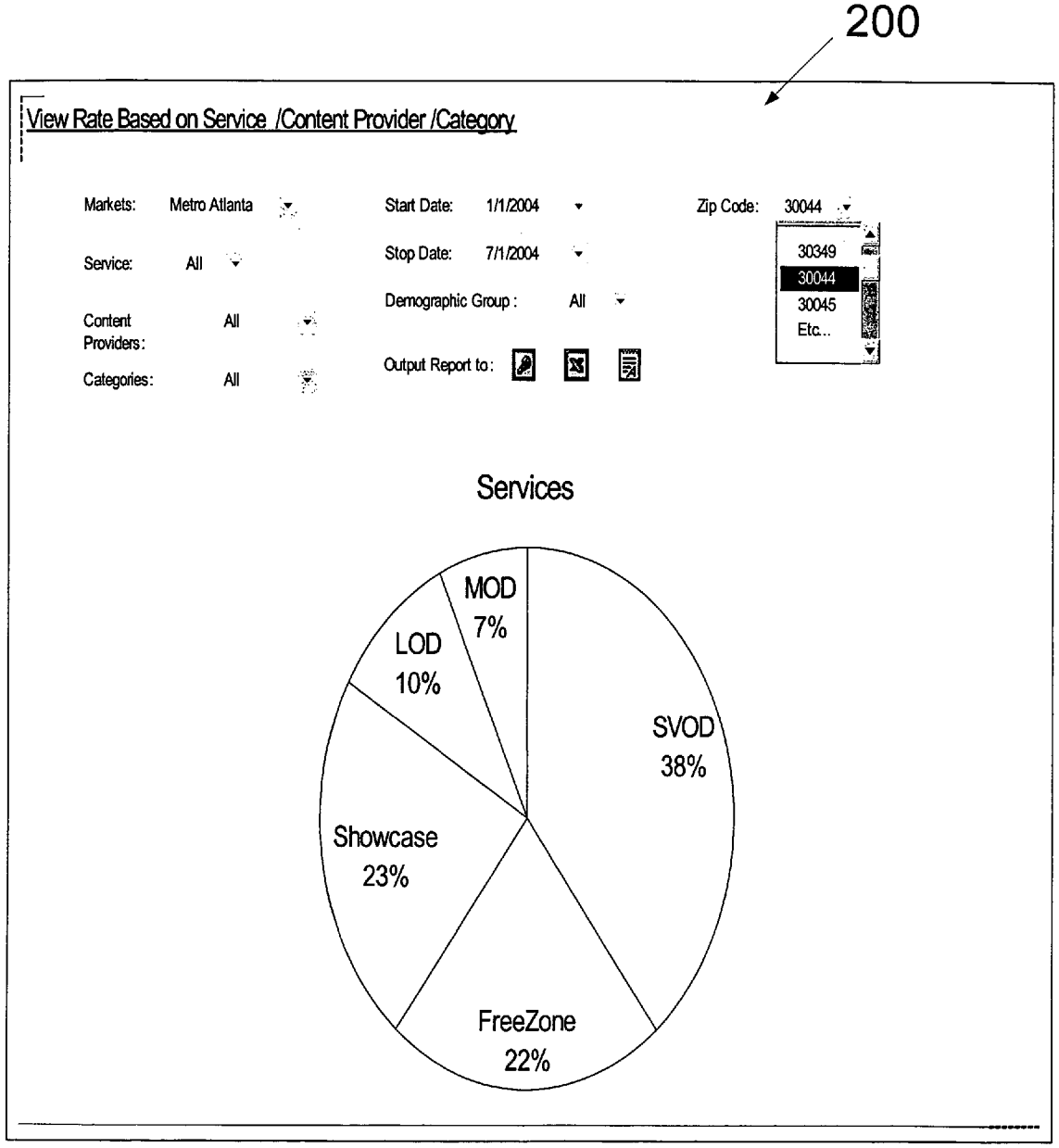
FIG. 5 is an exemplary output by the system of FIG. 1, according to one embodiment.

FIG. 5 illustrates another exemplary output 200 when using cable television/services system 100 of FIG. 1 to obtain customer preference data and customer usage data. The exemplary output 200 may provide a report detailing customer viewing rates based on service offering, content provider and content category. Accordingly, the content operator may view a variety of information related to customer preferences associated with a particular service offering, content provider and content category, for example, HBO versus Starz. As with the revenue analysis report, the report detailing customer viewing rates based on service offering, content provider and content category can focus data in the report based on a market or demographic.

Figure 6:
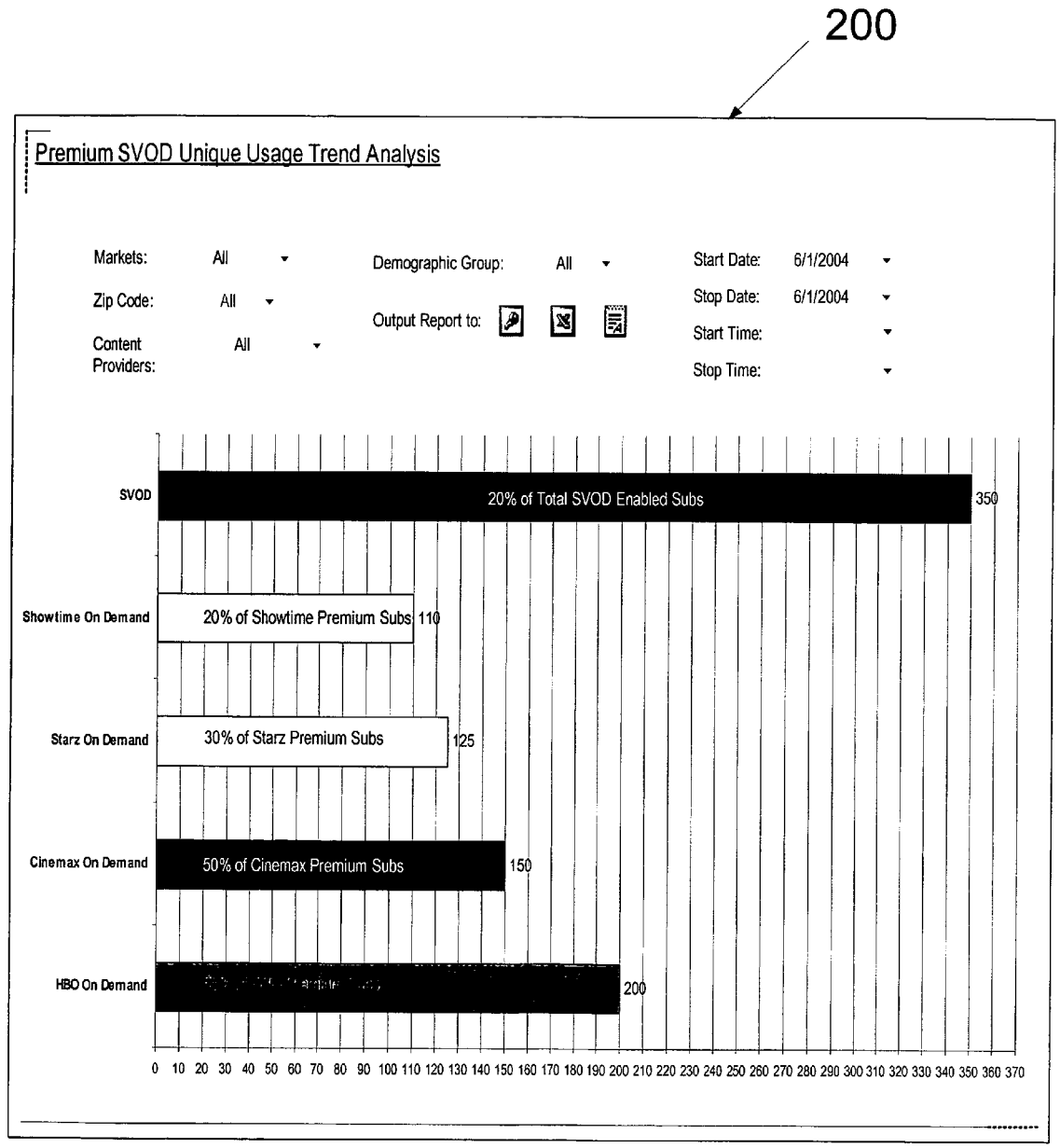
FIG. 6 is an exemplary output by the system of FIG. 1, according to one embodiment.

FIG. 6 illustrates another exemplary output 200 when using cable television/services system 100 of FIG. 1 to obtain customer preference data and customer usage data. The exemplary output 200 may provide a report detailing household percentages that view content using a SVOD service that have subscription access to that SVOD service. Accordingly, on Jun. 1, 2004, of a total Showtime SVOD subscriber base, 20% of the subscribers viewed Showtime On Demand content. Customer information may also be categorized to show customers in all markets that have a Showtime premium subscription and have used their subscription on a particular day to view content. For a given day, a customer may view content using multiple SVOD subscriptions (i.e., a customer may view content using a Showtime premium subscription and a HBO premium subscription in a day.) As with the revenue analysis report, the report detailing household percentages that view content using a SVOD service based on an amount of SVOD subscriptions for the household can focus data in the report based on a market, demographic and the like.

Figure 7:
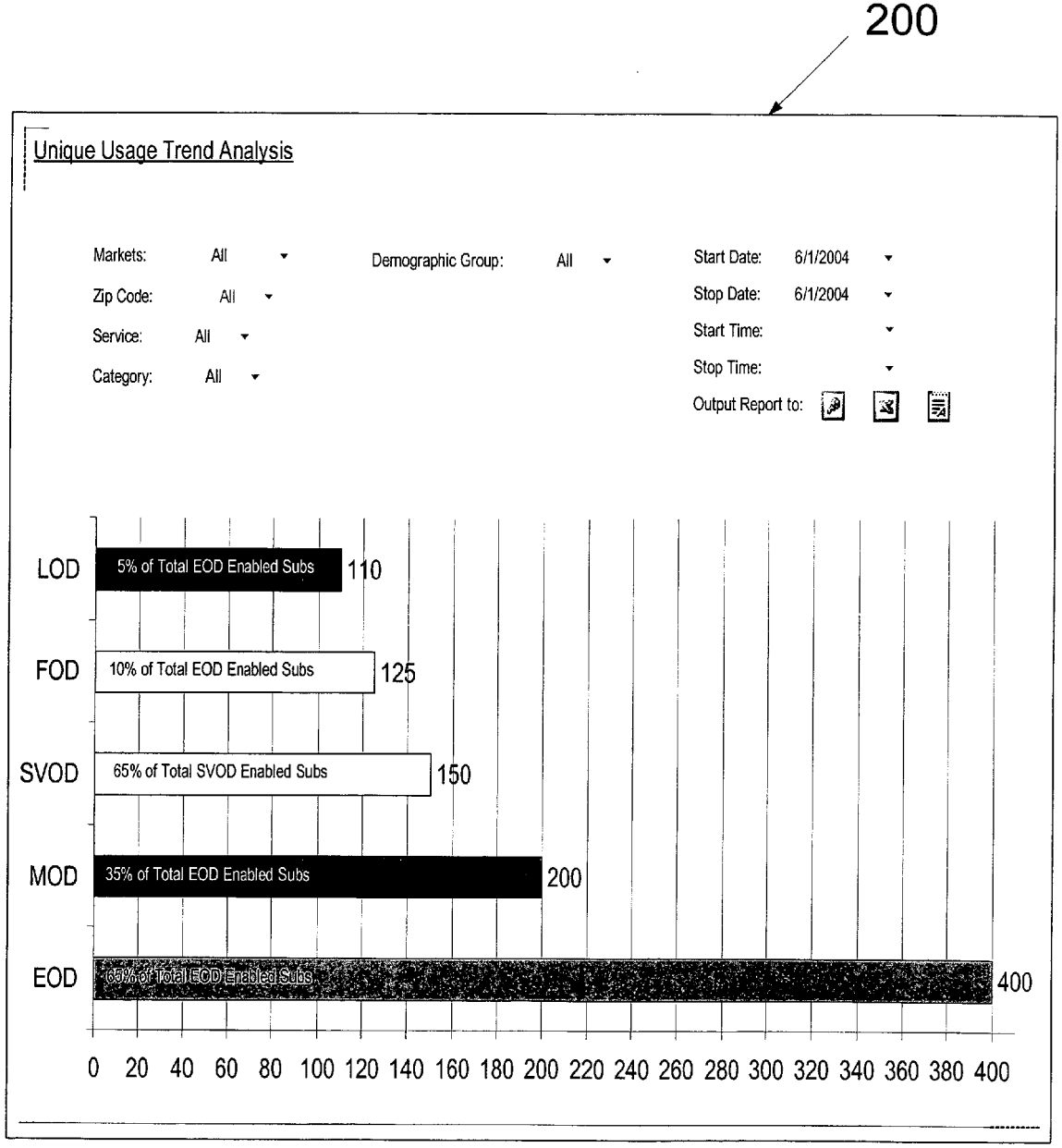
FIG. 7 is an exemplary output by the system of FIG. 1 according to one embodiment.

FIG. 7 illustrates another exemplary output 200 when using cable television/services system 100 of FIG. 1 to obtain customer preference data and customer usage data. The exemplary output 200 may provide a report detailing customer usage of services. For example, as indicated in FIG. 7, 65% of SVOD subscribers used an SVOD service for a given day. In addition, an indication of subscriber usage for all EOD services may be displayed and can show a particular service within the EOD services whether they are subscription based (HBO on-demand) or transactional based (MOD). As with the revenue analysis report, the detailing of customer usage of services can focus data in the report based on a market or demographic.

Figure 8:
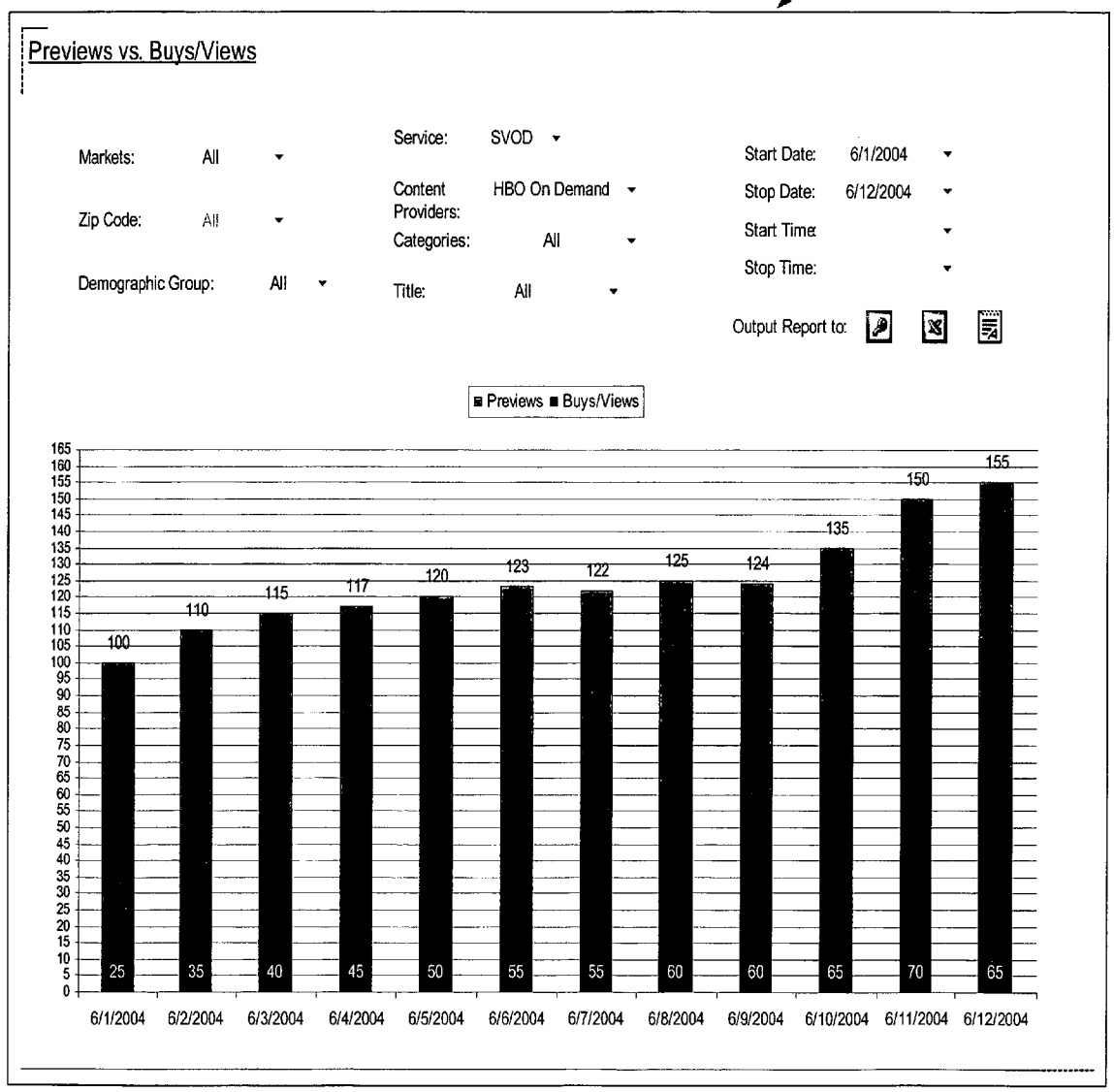
FIG. 8 is an exemplary output by the system of FIG. 1, according to one embodiment.

FIG. 8 illustrates another exemplary output 200 when using cable television/services system 100 of FIG. 1 to obtain customer preference data and customer usage data. The exemplary output 200 may provide a report indicating customer content previews versus customer content purchases. This report may display data relating to transactional and subscription based services, as well as, data based on a market or demographic. Thus, the data utilized from this report may be used by the content operator to fine tune preview information to entice customers to view content in its entirety.

Figure 9:
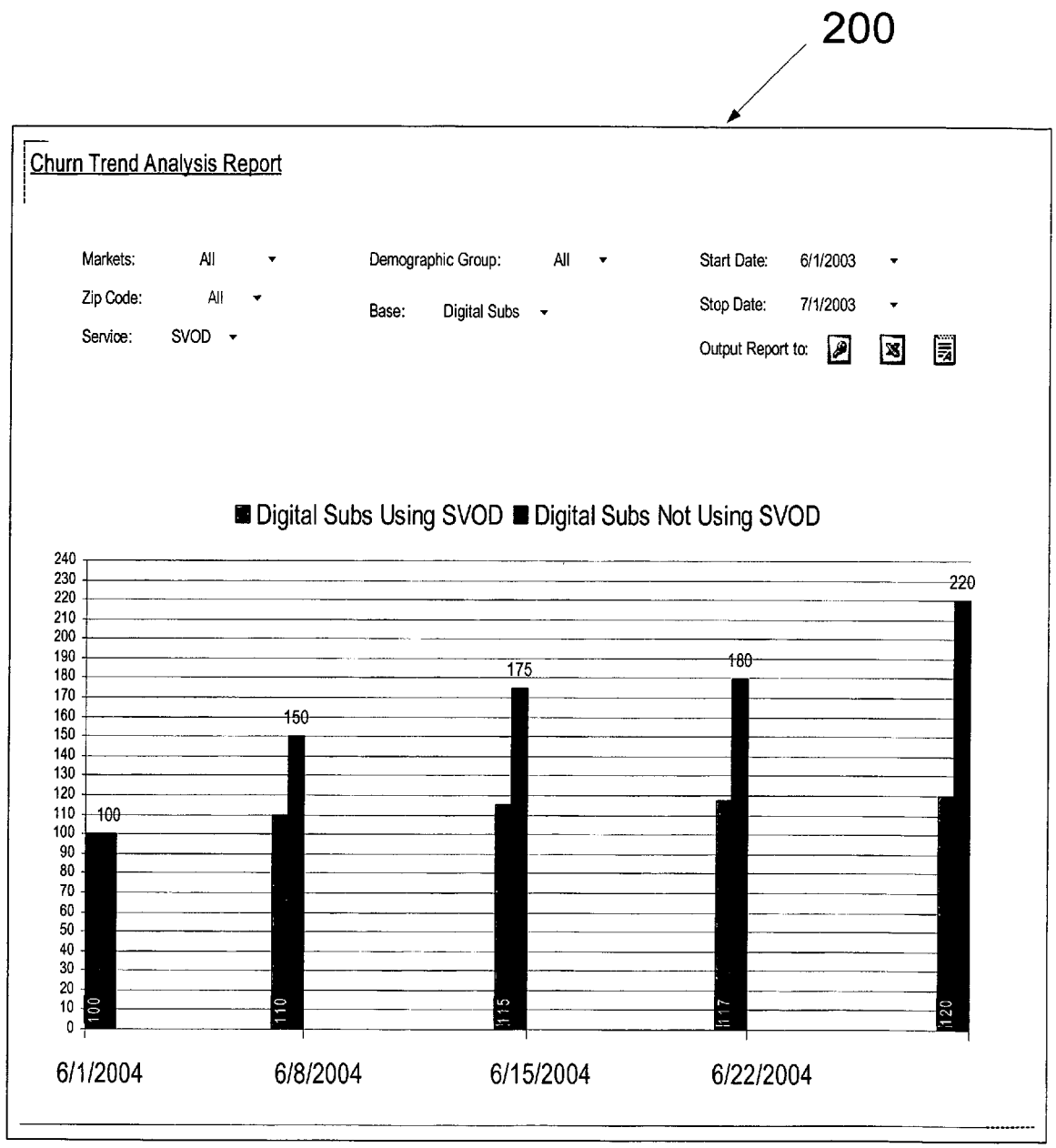
FIG. 9 is an exemplary output by the system of FIG. 1, according to one embodiment.

FIG. 9 illustrates another exemplary output 200 when using cable television/services system 100 of FIG. 1 to obtain customer preference data and customer usage data. The exemplary output 200 may provide a report detailing data related to customers which discontinue subscriber services (churn rate). The data displayed in the report may include data for a single service as well as data relating to several services. For example, FIG. 9 shows a churn rate comparison of digital cable subscribers using an SVOD service within a given time frame versus digital cable subscribers not using the SVOD service within the given time frame. Thus, such a report may indicate customer churn based on an amount of services received by the customer (i.e., do digital subscribers using SVOD services terminate content service more or less than those customers that do not receive SVOD services?). As with the revenue analysis report, the detailing of churn rate can focus data in the report based on a market or demographic.

Figure 10:
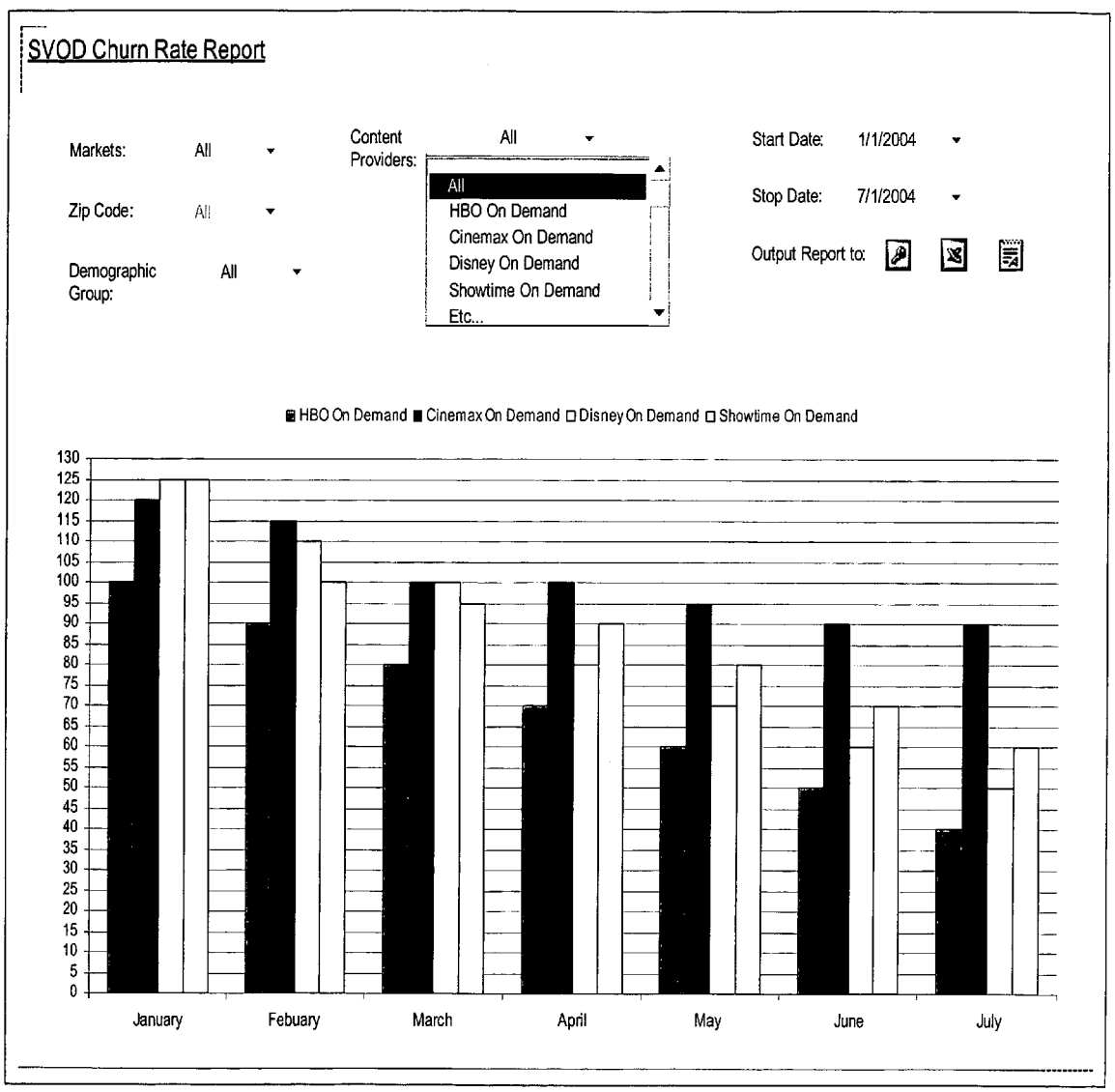
FIG. 10 is an exemplary output by the system of FIG. 1, according to one embodiment.

FIG. 10 illustrates another exemplary output 200 when using cable television/services system 100 of FIG. 1 to obtain customer preference data and customer usage data. The exemplary output 200 may provide a report detailing churn rate for particular SVOD subscription services. This report is similar to the churn report of FIG. 9 and can be used by content operator's to determine customer preferences for particular SVOD services. As with the revenue analysis report, the detailing of churn rate for SVOD subscribers based on the customer's SVOD subscription can focus data in the report based on a market or demographic.

Figure 11:
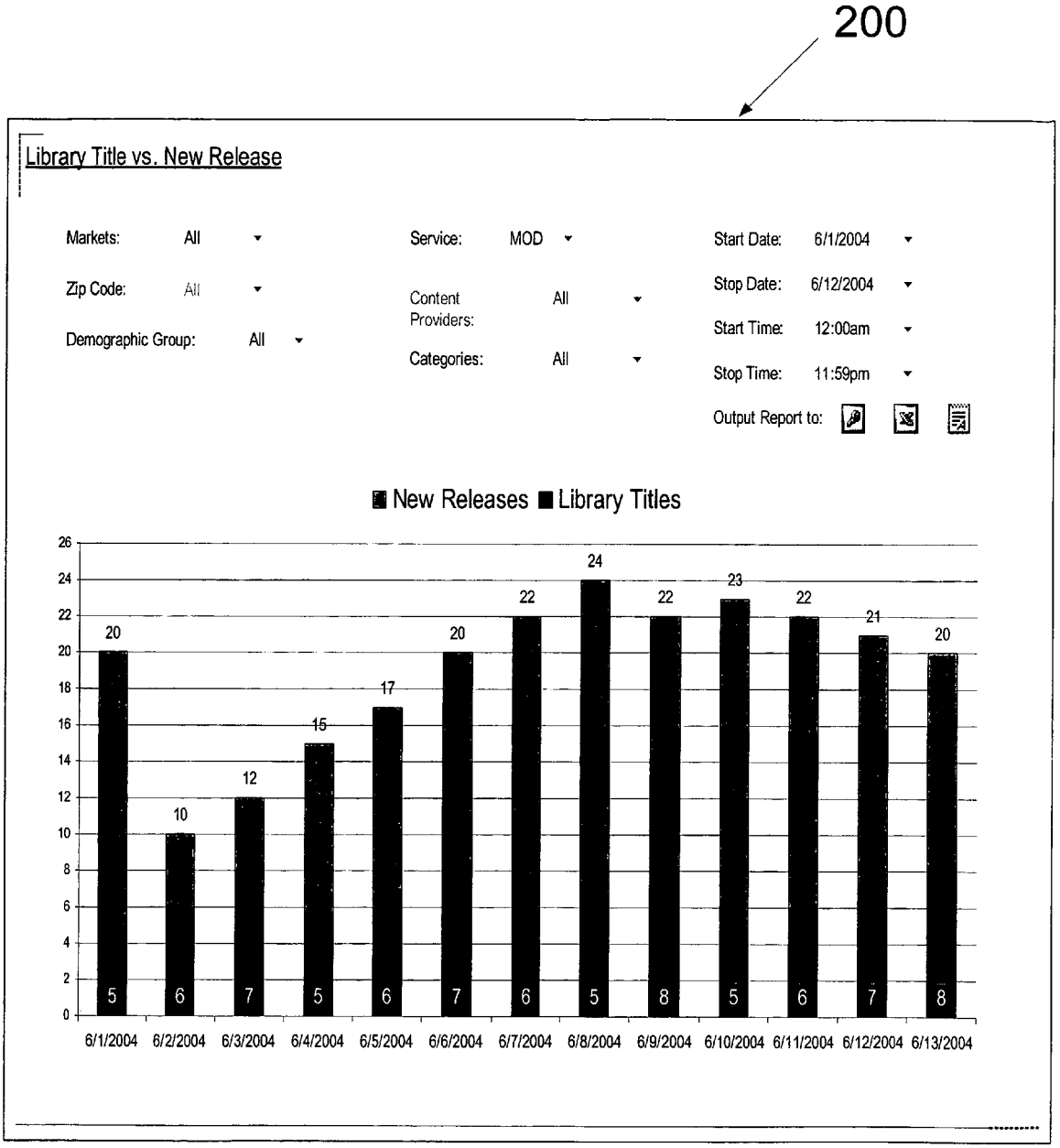
FIG. 11 is an exemplary output by the system of FIG. 1, according to one embodiment.

FIG. 11 illustrates another exemplary output 200 when using cable television/services system 100 of FIG. 1 to obtain customer preference data and customer usage data. The exemplary output 200 may provide a report comparing customer content viewing of new content versus content contained in a content library (older content). The comparison of customer preference between new content and older content can focus data in the report based on a market, content provider or demographic.

Figure 12:
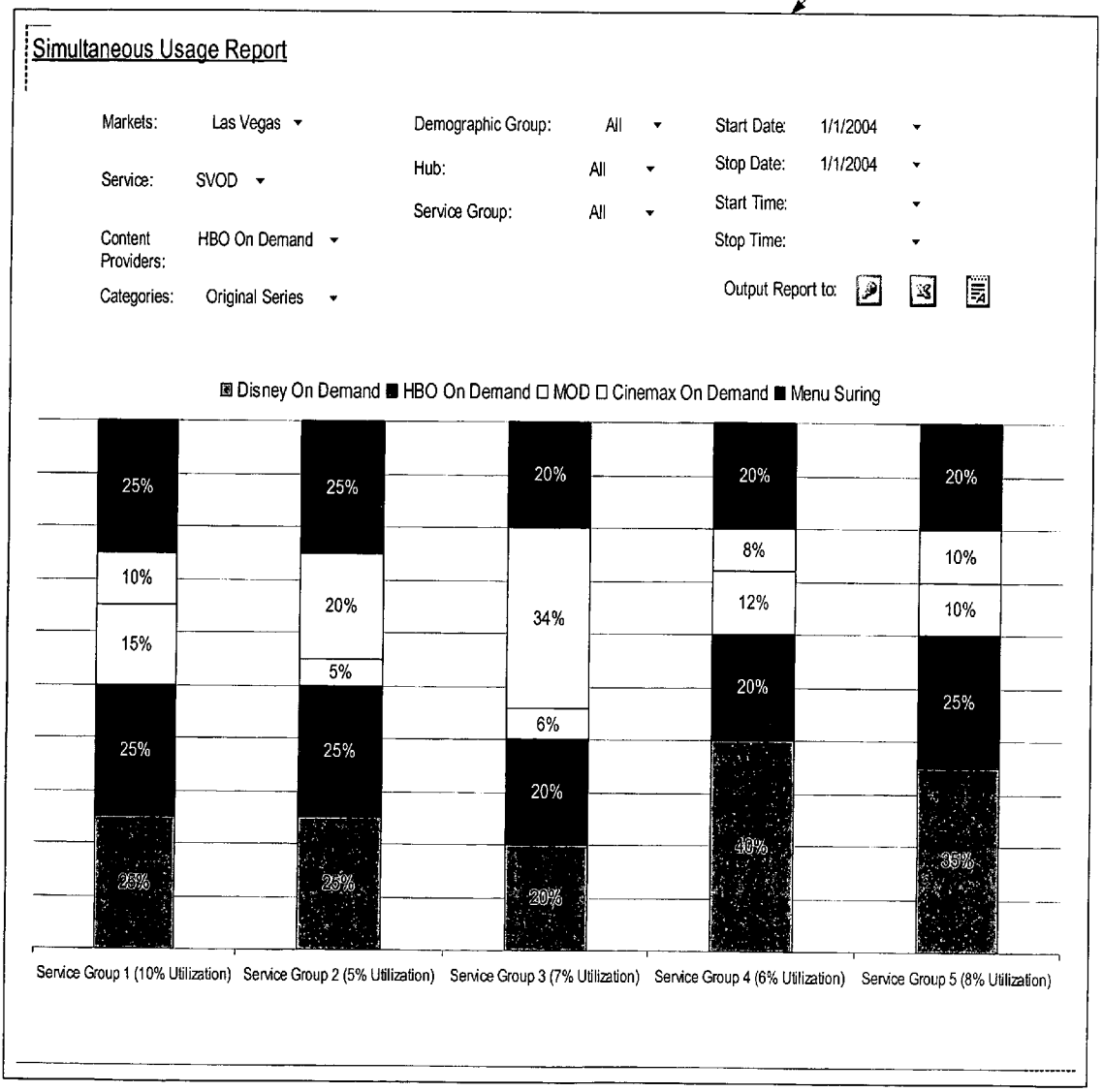
FIG. 12 is an exemplary output by the system of FIG. 1, according to one embodiment.

FIG. 12 illustrates another exemplary output 200 when using cable television/services system 100 of FIG. 1 to obtain customer preference data and customer usage data. The exemplary output 200 may provide a report detailing simultaneous usage rates for all markets, a single market or areas within a single market. This report may include data relating to customer utilization including menuing and content viewing. Thus, a content operator may determine how available system capacity is being utilized for a given service, as well as a specific category within a service. The detailing of simultaneous usage rates can focus data in the report based on a market, content provider, content category, or demographic.

Figure 13:
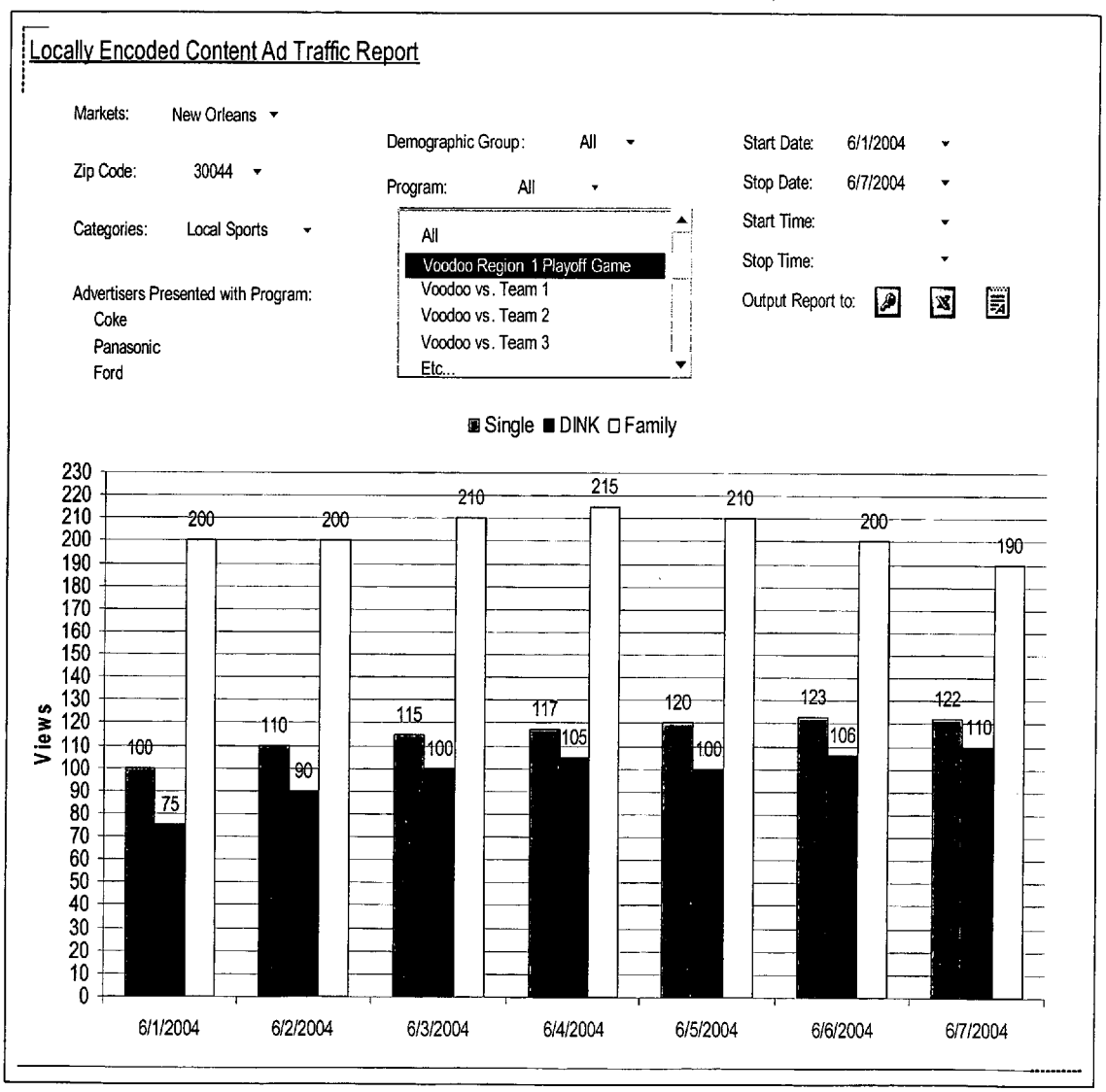
FIG. 13 is an exemplary output by the system of FIG. 1, according to one embodiment.

FIG. 13 illustrates another exemplary output 200 when using cable television/services system 100 of FIG. 1 to obtain customer preference data and customer usage data. The exemplary output 200 may provide a report detailing view rates for locally encoded content (Local on-demand) for an area within a market. Using this report, a content operator may measure exposure of specific advertising both in terms of total number of views and by demographic group. The detailing of view rates for locally encoded content can focus data in the report based on a market, zip code, advertisers, content category, program, demographic and the like.

Cable television/services system 100 may also provide ad hoc reporting as an exemplary output. Thus, a content operator may obtain desired data about a variety of topics relating to customers and content. Accordingly, information important to certain segments within a content operator's company may be obtained for use within the segment. Ad hoc reports may narrow date according to data, time range, market, hub, node, service group, demographic, title, content provider, content category, service, base and advertisers. The content operator may narrow data using drop down menus or any other method of selecting one or more topics.

By using customer feedback reporting a content operator may better provide customer service to customers through an analysis of data relating to customer preferences, usage when viewing content and system operations. In addition, the content operator may provide the data from the customer feedback reporting to a content provider to enable the content provider to tailor their content.

The invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents.

What is claimed is:

1. A method of reporting customer preference data and customer usage data in response to content provided to the customer, for use by a content operator, the method comprising:

extracting data, utilizing a microprocessor, in response to content selections by the customer, wherein the content selections comprise customer purchases of at least one piece of content, and wherein the extracted data indicates customer preference data based on a content selection;

storing the extracted data into a data repository;

categorizing the extracted data for use by the content operator;

receiving a query requesting categorized data from the data repository; and reporting the categorized data to the content operator, wherein the reporting of categorized data includes reporting revenue generated from the customer purchases of the at least one piece of content, the at least one piece of content comprising content provided by an on-demand content viewing service, wherein the reporting of categorized data further includes reporting churn trend data, the churn trend data comprising data related to customers which discontinue subscriber services, the churn trend data comprising a report indicating a comparison of customers using the on-demand content viewing service within a given time frame versus customers not using the on-demand content viewing service within the given time frame, wherein the reporting of the categorized data further includes a report detailing simultaneous usage rates for the viewing of on-demand content and for menu surfing related to the viewing of the on-demand content, wherein the reporting of the categorized data further includes ad-hoc data selected by a member of a business segment associated with the content operator, wherein the ad-hoc data is narrowed by the content operator using a drop-down menu in a user interface to narrow the data according to a hub utilized by the content operator.

2. The method of claim 1, further comprising extracting customer usage data and categorizing the usage data, wherein the categorized usage data is used to generate at least one report, the at least one report comprising buying trends for the customer content purchases over a period of time, wherein the buying trends are determined by dividing a number of the customer content purchases over a total number of customers.

3. The method of claim 2, wherein the customer preference data and customer usage data are extracted during communications between a cable television transmitter and a cable television receiver.

4. The method of claim 3, wherein the customer preference data and customer usage data is acquired from the customer's set top box.

5. The method of claim 2, wherein the customer usage data is used by the content operator to detect content transmission errors and content reception errors.

6. The method of claim 1, wherein the report of the categorized data includes pre-determined data for use by a business segment associated with the content operator.

7. The method of claim 1, wherein the customer preference data is used by the content operator to request content from a content provider.

8. The method of claim 1, wherein the data repository is centrally located.

9. The method of claim 8, wherein the centrally located data repository receives customer preference data and customer usage data from a plurality of regional data repositories.

10. The method of claim 9, wherein a regional data repository stores customer preference data and customer usage data from one or more customer markets.

11. The method of claim 10, wherein the customer preference data includes viewing selection data from the customer, wherein the customer's selection chooses content for viewing from a plurality of entertainment on-demand options.

12. The method of claim 1, wherein the reporting of categorized data further includes reporting data for anyone of the following: service offering data, content provider data, content category data, subscription data, movie selection comparison data, simultaneous usage data, subscription on-demand usage, usage trend data and local market data.

13. A computer-readable hardware storage medium containing computer-executable instructions which, when executed on a computer, will cause the computer to perform a method of for reporting customer preference data and customer usage data in response to content provided to the customer, for use by a content operator, the method comprising:

extracting data in response to content selections by the customer, wherein the content selections comprise customer purchases of at least one piece of content, and wherein the extracted data indicates customer preference data based on a content selection;

storing the extracted data into a data repository;

categorizing the extracted data for use by the content operator;

receiving a query requesting categorized data from the data repository; and reporting the categorized data to the content operator, wherein the reporting of categorized data includes reporting revenue generated from the customer purchases of the at least one piece of content, the at least one piece of content comprising content provided by an on-demand content viewing service, wherein the reporting of categorized data further includes reporting churn trend data, the churn trend data comprising data related to customers which discontinue subscriber services, the churn trend data comprising a report indicating a comparison of customers using the on-demand content viewing service within a given time frame versus customers not using the on-demand content viewing service within the given time frame, wherein the reporting of the categorized data further includes a report detailing simultaneous usage rates for the viewing of on-demand content and for menu surfing related to the viewing of the on-demand content, wherein the reporting of the categorized data further includes ad-hoc data selected by a member of a business segment associated with the content operator, wherein the ad-hoc data is narrowed by the content operator using a drop-down menu in a user interface to narrow the data according to a hub utilized by the content operator.

14. The computer-readable hardware storage medium of claim 13, further comprising extracting customer usage data and categorizing the usage data, wherein the categorized usage data is used to generate at least one report, the at least one report comprising a report of customer previews of the at least one piece of content versus the customer purchases of the at least one piece of content.

15. The computer-readable hardware storage medium of claim 13, wherein the customer preference data and customer usage data are extracted during communications between a cable television transmitter and a cable television receiver.

16. The computer-readable hardware storage medium of claim 13, wherein the customer usage data is used by the content operator to detect content transmission errors and content reception errors.

17. The computer-readable hardware storage medium of claim 13, wherein the data repository is centrally located and wherein the centrally located data repository receives customer preference data and customer usage data from a plurality of regional data repositories.

18. The computer-readable hardware storage medium of claim 17, wherein a regional data repository stores customer preference data and customer usage data from one or more customer markets.

19. The computer-readable hardware storage medium of claim 13, wherein the customer preference data includes viewing selection data from the customer, wherein the customer's selection chooses content for viewing from a plurality of entertainment on-demand options.

* * * * *